(12) United States Patent
Gaffney et al.

(10) Patent No.: US 8,105,968 B2
(45) Date of Patent: Jan. 31, 2012

(54) BIMETALLIC ALKYLATION CATALYSTS

(75) Inventors: Anne Mae Gaffney, West Chester, PA (US); Philip Jay Angevine, Woodbury, NJ (US); Cheun Yuan Yeh, Edison, NJ (US); Johannes Hendrik Koegler, Montclair, NJ (US); Jingguang Chen, Hockessin, DE (US); Emanuel Hermanus van Broekhoven, Monnickendam (NL)

(73) Assignee: Lummus Technology Inc., Bloomfield, NJ (US)

( * ) Notice: Subject to any disclaimer, the term of this patent is extended or adjusted under 35 U.S.C. 154(b) by 570 days.

(21) Appl. No.: 11/906,945

(22) Filed: Oct. 4, 2007

(65) Prior Publication Data

US 2008/0087574 A1    Apr. 17, 2008

Related U.S. Application Data

(60) Provisional application No. 60/852,380, filed on Oct. 17, 2006.

(51) Int. Cl.
*B01J 29/06* (2006.01)

(52) U.S. Cl. ............... 502/60; 502/63; 502/64; 502/66; 502/68; 502/79

(58) Field of Classification Search ............. 502/60, 502/63, 64, 66, 68, 71, 73, 74, 79
See application file for complete search history.

(56) References Cited

U.S. PATENT DOCUMENTS

| | | | | |
|---|---|---|---|---|
| 5,198,597 | A * | 3/1993 | O'Young et al. | 585/654 |
| 5,324,881 | A * | 6/1994 | Kresge et al. | 585/721 |
| 5,986,158 | A | 11/1999 | Van Broekhoven | |
| 6,793,911 | B2 | 9/2004 | Koegler | |
| 6,844,479 | B2 | 1/2005 | Yeh | |
| 6,855,856 | B2 | 2/2005 | Van Broekhoven | |
| 7,176,340 | B2 | 2/2007 | Van Broekhoven | |
| 2002/0013216 | A1 | 1/2002 | Van Broekhoven | |
| 2002/0198421 | A1 | 12/2002 | Van Broekhoven | |
| 2002/0198422 | A1 | 12/2002 | Van Broekhoven | |
| 2003/0092948 | A1 | 5/2003 | Van Broekhoven | |
| 2003/0181779 | A1 | 9/2003 | Van Broekhoven | |
| 2003/0220529 | A1 | 11/2003 | Nat et al. | |
| 2004/0010176 | A1 | 1/2004 | Yeh et al. | |
| 2004/0138051 | A1 * | 7/2004 | Shan et al. | 502/60 |
| 2004/0162454 | A1 | 8/2004 | Gao et al. | |

OTHER PUBLICATIONS

International Search Report, Feb. 27, 2008.

* cited by examiner

*Primary Examiner* — Elizabeth Wood
(74) *Attorney, Agent, or Firm* — Alix, Yale & Ristas, LLP

(57) ABSTRACT

Solid acid catalysts for use in alkylation processes are described. The solid acid catalysts include a multimetallic (e.g. bimetallic, trimetallic or tetrametallic) component that performs a hydrogenating function for the reactivation (or regeneration) of the catalyst in the presence of hydrogen. The multimetallic catalyst includes a noble metal such as platinum or palladium. The invention also relates to alkylation processes using the multimetallic solid acid catalysts having a multimetallic component for hydrogenation.

17 Claims, 14 Drawing Sheets

| COKE/PRECURSOR SPECIES | $\nu(C=C)$ MODE |
|---|---|
| OLEFINIC | 1635 cm$^{-1}$ |
| CONJUGATED OLEFINIC | 1560 cm$^{-1}$ |
| AROMATIC | 1610 cm$^{-1}$ |
| POLYAROMATIC/PREGRAPHITIC | 1585-1595 cm$^{-1}$ |
| GRAPHITE | 1575 cm$^{-1}$ |

FIG. 4

BIMETALLIC ALKYLATION CATALYSTS

This application claims the benefit under 35 U.S.C. §119 (e) to U.S. Provisional Application No. 60/852,380 filed on Oct. 17, 2006, the contents of which are hereby incorporated by reference in their entirety.

FIELD OF THE INVENTION

The present invention relates to solid acid catalysts for use in alkylation processes. The solid acid catalyst includes a multimetallic (e.g. bimetallic, trimetallic or tetrametallic) component that performs a hydrogenating function for the reactivation (or regeneration) of the catalyst in the presence of hydrogen. The invention also relates to alkylation processes using a solid acid catalyst having a multimetallic component for hydrogenation.

BACKGROUND

"Alkylation" generally refers to the reaction of a hydrocarbon, such as an aromatic or a saturated hydrocarbon, with an olefin. For example, in one type of reaction of particular interest, a branched saturated hydrocarbon, such as isobutane, may undergo alkylation with an olefin containing 2-6 carbon atoms, such as 2-butene, to produce an alkylate that has a higher octane number and which boils in the gasoline range. Processes directed to the alkylation of paraffins with olefins produce branched hydrocarbon molecules for gasoline components, such as isomers of octane, e.g. trimethylpentanes ("TMPs"), which have high octane numbers. A gasoline with a high octane number, often expressed as research octane number ("RON"), can reduce engine knock, which lessens the need to add environmentally harmful anti-knock compounds such as tetraethyllead. A second octane measurement, motor octane number ("MON"), also describes the anti-knock properties of gasoline. MON is measured when the test engine is run under heavy load (higher rpm), and the RON is measured at lower load (lower rpm).

Gasoline produced by the alkylation process is essentially free of contaminants, such as sulfur and nitrogen that may be present in gasoline obtained by other processes, such as cracking heavier petroleum fractions, e.g. vacuum gas oil and atmospheric residue. Sulfur oxides ("SOx"), a combustion product, are the primary cause of pollutants. In addition to direct SOx emissions, SOx can significantly lower the effectiveness of catalytic converters, thereby adversely impacting SOx, NOx, and CO emissions. SOx also form indirect particulates—a combination of water and SOx to form sulfurous and sulfuric acids. These indirect particulates normally exist in the 1-10 micron range, which are "inhalable particulates" that cause health problems, especially to people who suffer from asthma or emphysema. Also, unlike gasoline obtained by reforming naphtha or by cracking heavier petroleum fractions, alkylate contains few if any aromatics or olefins. Aromatics, especially benzene, are toxic, and olefins are reactive in photochemical reactions which cause ozone and smog.

The alkylation reaction is acid-catalyzed. Liquid acid catalysts, such as sulfuric acid or hydrofluoric acid, have been commonly used in alkylation processes. The use of liquid acid catalysts has several disadvantages. The liquid acids used are highly corrosive, requiring special quality, more expensive equipment. Because the presence of these acids in the resulting fuel is undesirable, any acid remaining in the alkylate must be removed. This process is complicated and expensive. In addition, the liquid acids, especially hydrofluoric acid, are dangerous if released into the environment.

To address these and other deficiencies of liquid acid catalysts, solid acid catalysts have been developed for use in alkylation processes. The solid catalysts typically employ a solid acid catalyst and a metal that provides a hydrogenation function. For example, U.S. Pat. No. 6,855,856 describes a catalyst comprising a solid acid, such as a zeolite, and a hydrogenation function. The solid acid described has a defined range for the ratio of the volume of catalyst pores to the specific length of the catalyst particles.

A disadvantage of the prior solid acid catalysts is that the catalyst can become rapidly deactivated due to the formation of polyalkylates (e.g. C12+ product) which inhibits the alkylation reactions—somewhat like very soft coke. As soon as the catalyst forms a certain level of polyalkylates, the catalyst essentially stops the alkylation reactions. In a fixed bed reactor, an often preferred configuration, one can view the deactivation as occurring as a band-wise aging, with the deactivation zone moving as a band throughout the bed until most of the bed is inactive. This catalyst deactivation requires that the catalyst be periodically regenerated to ensure that the process produces a sufficient yield of the desired product. Regeneration of the catalyst typically requires that the alkylation process be stopped for a period of time. This reduces production and increases the cost of the alkylation process, especially by lowering the "onstream" factor of the process.

A preferred method of regeneration of the catalyst is hydrogenation. The hydrogenation function is typically provided by a metal of Group VIII of the Periodic Table of the Elements, in particular the noble metals such as platinum (Pt) or palladium (Pd). Unlike the classical bifunctional (metal/acid) catalyst, the hydrogenation function plays little or no direct role in the alkylation reactions itself. Instead, it plays a critical role in the effective $H_2$ reactivation (also called "regeneration" here) of the deactivated catalyst. The hydrogenation function is important in both the so-called low temperature ("low T") and high temperature ("high T") regenerations, described below.

Various attempts have been made to develop improved solid acid catalysts. For example, U.S. Publication No. 2004/0162454 describes an alkylation catalyst comprising nanocrystalline zeolite Y and a hydrogenation metal. The pore size of the nanocrystalline zeolite Y provides an alkylate with a higher RON/MON, as well as a longer run time for the catalyst. The nanocrystalline zeolite Y catalyst also includes a metal of Group VIII of the Periodic Table of the Elements, such as Pt or Pd, to provide a hydrogenation function.

To increase the efficiency and productivity of the alkylation process using solid acid catalysts, various methods have been developed to improve the process of regenerating solid acid catalysts. For example, U.S. Pat. No. 7,176,340 describes a continuous process for alkylation using a total of at least four catalyst containing reactors. However, use of multiple reactors increases the cost of the process; this cost increase may be offset, at least in part, by the efficiency increase of the overall process U.S. Pat. No. 5,986,158 describes an alkylation process in which the catalyst is subjected intermittently to a regeneration step by being contacted with a feed containing a saturated hydrocarbon and hydrogen, with the regeneration carried out at 90% or less of the active cycle of the catalyst. While these regeneration methods improve the overall efficiency of the alkylation process, the relatively large amounts of solid acid catalysts and associated noble metals required could be a problem that affects the commercial viability of the alkylation process.

It would be desirable to have a solid acid catalyst for the alkylation process that provided longer run times prior to deactivation. It would also be desirable to have a solid acid catalyst that that utilizes a metal for the hydrogenating function that provides equal or improved performance as compared to Pt or Pd, and that may be available at a lower cost. The present invention overcomes one or more of these and other drawbacks or disadvantages of prior solid acid catalysts used in alkylation processes.

SUMMARY OF THE INVENTION

The present invention is directed to solid acid catalysts for olefin/paraffin alkylation, and the use of the solid acid catalysts in the alkylation process. The solid acid catalyst comprises a zeolite and a hydrogenating function. The zeolite may be any zeolite known to those skilled in the art for use in solid acid catalysts for alkylation processes. In a preferred embodiment, zeolites having a faujasite structure may be used in the solid acid catalyst. The extended faujasite family can include X, Y, ZSM-20, and EMT. For illustrative purposes of this invention, the description of preferred embodiments will focus on zeolite Y (including ultrastable Y—"USY", i.e. having a unit cell of 24.50 Å or less), zeolite X, and combinations of zeolites X and Y.

The hydrogenating function is often preferably provided by a bimetallic or trimetallic component. Conventionally, the bimetallic or trimetallic component would include various noble metals, for example Pt or Pd, in combinations such as for example PtNi, PtCo, PtAg, PtAu, PtPdNi, PtPdAg, PtPdAu, PdNi, PdAg, and PdAu. Combinations of Pt or Pd with Ru, Ir, Rh, Cu and Re have also been used. In some instances tetrametallics can be employed (e.g. PtPdAgAu or PtNiReIrAu).

The present invention is a major departure from the traditional use of bimetallic noble metal catalysts. In the catalysts of the present invention, the strong hydrogenation function is provided by a combination of Pt and at least one "3d" metal (i.e. Ni, Co, Mn, Cr, V, Fe, or Ti). The inventors have discovered that this synergistic combination can provide excellent regeneration at lower Pt or Pd loadings. This formulation can lower the overall catalyst cost and simplify waste recovery. In one embodiment, the novel catalyst can include one or two "3d" metals along with one or two noble metals, as long as one noble metal is Pt or Pd. In another embodiment, the catalyst comprises Pt or Pd and three "3d" metals.

Optionally, the solid acid catalyst component may include a matrix material, such as alumina, silica, silica-alumina, zirconia, clay, or combinations thereof.

The catalyst may be used in a process for the alkylation of a paraffin with an olefin, such as alkylation of isobutane with butylene (ideally 2-butene), to produce a gasoline product having a high RON and MON.

One advantage of the solid acid catalysts of this invention is that they include multimetallic materials that are less costly than catalysts having only Pt or Pd, while performing equivalent or superior regeneration duty. Other advantages of the present invention will be readily apparent to those skilled in the art based on the detailed description of preferred embodiments set forth below.

BRIEF DESCRIPTION OF THE DRAWINGS

FIG. 4 is a table summarizing the characteristic vibrational features of coke and coke precursors.

DETAILED DESCRIPTION OF THE PREFERRED EMBODIMENTS

Figure 1:
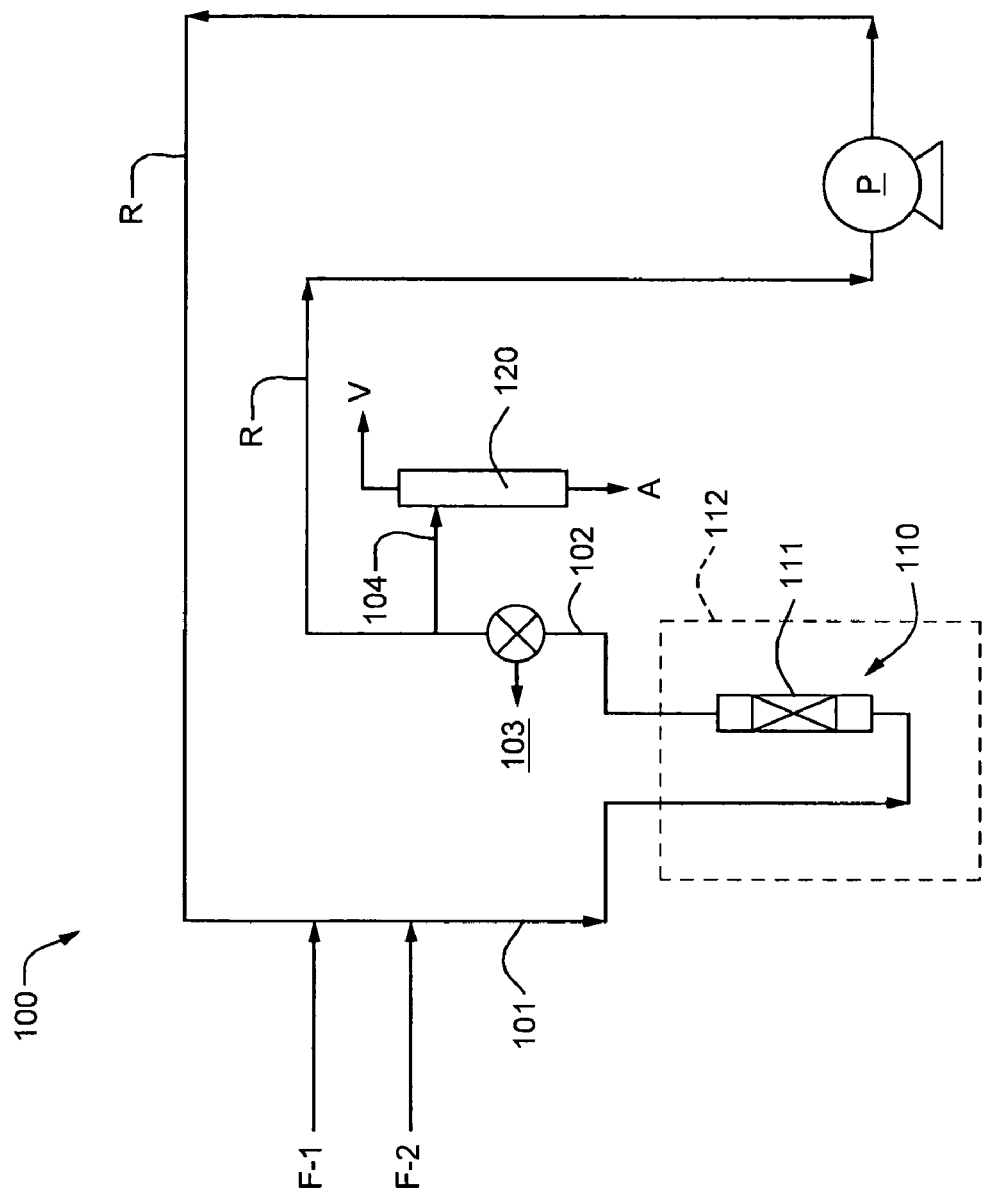
FIG. 1 is a schematic drawing of the reactor system used in the processes described in Examples 8-14.

The present invention relates to a catalyst for use in processes for the alkylation of a paraffin (e.g. isobutane) to an olefin (e.g. 2-butene) to produce a gasoline product. The catalyst comprises a solid acid zeolite and a hydrogenating function. The catalyst may also include a matrix or binder material. The hydrogenating function is provided by a multimetallic component, preferably a bimetallic or trimetallic component, that is incorporated primarily within the zeolite structure. However, the invention is not limited in this regard, and some of the mentioned hydrogenation function can reside on the binder as well as the external zeolitic surface. The following description of preferred embodiments generally uses the term "bimetallic" in describing the catalyst, but it should be understood that the invention is not limited to use of bimetals, and that any multimetallic material, or combination of multimetallic materials, that provides a hydrogenating function can be incorporated in the solid acid catalyst.

Numerous solid acid zeolites are known in the art for use in alkylation processes. Any of these zeolites may be used as the solid acid catalyst in the present invention. A preferred zeolite for use in the present invention is a zeolite having a faujasite structure, such as zeolite Y or zeolite X. Zeolite Y is particularly preferred. In an especially preferred embodiment, a nanocrystalline zeolite Y is used, such as for example the nanocrystalline zeolite Y described in U.S. Pat. No. 6,793,911 and United States Patent Publication No. 2004/0162454, the contents of each of which are hereby incorporated in their entirety.

As described in United States Patent Publication No. 2004/0162454, nanocrystalline zeolite Y offers advantages when used in the alkylation process. The zeolite has a crystal size of no more than about 100 nanometers (nm). The maximum diffusion distance of many reactants and, more importantly, products is decreased. Coking and the associated catalyst deactivation are reduced by enabling 1) the desired C8 products to leave the catalyst before subsequent alkylation reactions occur, i.e. forming C12+ heavies, and 2) the coke precursors (e.g. C12+ heavies) to leave the catalyst before undergoing retrogressive condensation reactions. The nanocrystalline zeolite Y catalysts also exhibit higher activity than zeolite catalysts having larger crystal sizes due to an improved effectiveness factor.

The hydrogenating function in the solid acid catalysts is preferably provided by a catalytically active bimetallic or trimetallic component. The bimetallic or trimetallic component is preferably comprised of at least one metal from Group VIII of the Periodic Table of the elements. Multimetallic components that include Pt or Pd as one of the metals are preferred, such as PtNi, PtCo, PtAg, PtAu, PdNi, PdAg, and PdAu, or PtPdNi, PtPdAg, PtPdAu. Combinations of Pt or Pd with Ru, Ir, Rh, Cu and Re may also be used. The invention is not limited in this regard, and any multimetallic (especially bimetallic or trimetallic) component may be used that will provide a hydrogenation function in the alkylation reaction. For example, Group VIB metals, including for example, Mo and V may be used in a multimetallic component, or multimetallics that do not include either Pt or Pd, such as for example a TiNiHf combination may be employed.

The multimetallic (especially bimetallic or trimetallic) component is incorporated in the zeolite using conventional techniques known to those skilled in the art, such as for example by ion exchange, impregnation of the zeolite or incorporation of the multimetal in the synthesis material from which the zeolite is made. The preferred method of multimetal incorporation is by ion exchange. Because the zeolites are highly selective, a salt of the multimetal can be chosen to enhance uptake of the multimetallic component. For example, tetraammine salts (e.g. chlorides, nitrates or hydroxides) of the multimetals can be prepared and used to incorporate the bimetallic component in the zeolite. The multimetal may also be incorporated using a sequential process, sometimes referred to as "double dip", in which the zeolite is exposed to the salt solution, followed by drying and calcining to fix the multimetal in the zeolite, and the process is repeated until the desired amount of the multimetal has been incorporated in the zeolite.

The solid acid catalyst preferably contains from about 0.01 weight % to about 2.0 weight % of the multimetallic (e.g. bimetallic or trimetallic) component, more preferably contains between about 0.02 weight % to about 1.0 weight % of the multimetallic component, and even more preferably about 0.05 weight % to about 0.5 weight % of the multimetallic component.

The solid acid catalyst will usually include matrix (also called binder) components, particularly to give physical integrity (e.g. crush strength, reduced fines generation, etc.) as well as macroporosity. If used, the matrix components can be combined with the zeolite before, or after, the process by which the multimetal is incorporated into the catalyst. Materials that may be used as matrix components are generally inorganic oxides such as aluminas, silicas, silica-aluminas, zirconias, clays, etc. The matrix may be in the form of a sol, hydrogel or gel, and it may be catalytically active or inert. If a matrix material is used, the matrix material may comprise between about 2% to about 98% by weight matrix material of the combined weight of the matrix material and the zeolite. The quantity of matrix material included in the solid acid catalyst is selected to achieve a desired crush strength while maintaining sufficient catalyst activity in view of the dilution of the zeolite by the matrix component. Preferably, the matrix material will comprise between about 5% by weight to about 70% by weight of the combined weight of the matrix material and the zeolite, and more preferably between about 10% by weight and about 50% by weight. In a particularly preferred embodiment, the matrix material comprises between about 15% by weight and about 30% by weight of the combined weight of the matrix material and the zeolite.

The multimetallic solid acid catalyst preferably has an extrudate diameter of between about 0.08 mm and about 2.5 mm. When used in a fixed-bed reactor the extrudate diameter is preferably at least about 0.5 mm with an upper limit of about 1.8 mm. Smaller diameters may be used in fluidized bed or slurry reactors. The catalyst preferably has an average micropore diameter of about 7.4 Å when using zeolite X or Y.

The multimetal solid acid catalyst may be used in several alkylation process configurations to catalyze the reaction of a paraffin and an olefin, producing a gasoline having a high RON and MON. The alkylation process may be performed in any suitable form reaction system known to those skilled in the art, such as by entrained fluidized bed processes, fixed fluidized bed processes, ebullated bed reactors, slurry processes and fixed bed processes. For example, the alkylation process may be a process such as that described in U.S. Pat. No. 6,844,479 or in United States Publication No. 2004/0162454, the contents of each of which are incorporated herein in their entirety.

Typically, the alkylation process is practiced under conditions such that at least a portion of the alkylation agent and the alkylatable compound will be in the liquid phase or the supercritical phase. In general, the process is practiced at a temperature in the range of about −40° to about 250° C., preferably in the range of about 50° to about 150° C., more preferably in the range of about 70° to about 100° C., and a pressure of between about 1 to about 100 bars, preferably between about 10 to about 40 bars, and more preferably between about 15 to about 30 bars. The molar ratio of alkylatable compound to alkylation agent in the total feed in the reactor preferably is higher than about 5:1, and more preferably higher than about 50:1. Higher molar ratios are considered preferred for performance reasons, because they generally yield an increase in product octane number and catalyst stability. The upper limit for this ratio is determined by the type of process applied, and by the process economics. The upper limit molar ratio is not critical, and may be as high as about 5000:1. Generally, molar ratios of, e.g., about 1000:1 or lower are preferred for economic reasons. In many current applications, a molar ratio of alkylatable compound to alkylation agent of 150-750:1 is considered most preferred. The feed rate (WHSV) of the alkylation agent generally is in the range of about 0.01 to about 5, preferably in the range of about 0.05 to about 0.5, and more preferably in the range of about 0.1 to about 0.3 grams of alkylation agent per gram of catalyst per hour. The WHSV of the alkylatable saturated hydrocarbon preferably is in the range of about 0.1 to about 500. It should be understood that the use of the solid acid catalyst of the present invention is not limited to any particular reaction conditions, and the conditions described above are exemplary.

The catalyst of the invention is particularly suited to be used for alkylating isoalkanes having 4-10 carbon atoms, such as isobutane, isopentanes or isohexanes or mixtures thereof, with olefins having 2-10 carbon atoms, preferably 2-6 carbon atoms, and more preferably 3-5 carbon atoms. The alkylation of isobutane with butane or a mixture of butenes is a particularly preferred embodiment. The invention is not limited in this regard, and any appropriate paraffin or olefin may be utilized in the alkylation process to obtain a desired product.

The catalyst of the present invention may also be used for other types of alkylation processes, such as processes involving cycloalkanes or arylalkanes. For example, the catalysts may be used in processes to upgrade the cetane number of certain distillate streams. In one example, light cycle oil ("LCO"), a distillate product from a Fluid Cracking Catalyst ("FCC") process, contains bare ring and slightly alkylated aromatic rings; as such, its cetane number is quite low—typically 10-30. Hydrogenation of the LCO only marginally upgrades the cetane number. Typical hydrogenated components are slightly alkylated cycloalkanes, such as methylethylcyclohexane. In one embodiment, the catalyst can be used in a process to combine the hydrogenated LCO with a rough-cut stream of C4-C6 olefins to produce a higher quality diesel fuel.

Catalyst regeneration can be performed utilizing a low temperature method or a high temperature method. The low temperature method is performed frequently, long before olefins show up in the product composition, preferably at below about 20% of the time active cycle of the catalyst. The active cycle of the catalyst is defined as the time from the start of the feeding of the alkylation agent to the moment when, in comparison with the entrance of the catalyst-containing reactor section, about 20% of the alkylation agent leaves the catalyst-containing reactor section without being converted, not counting isomerization inside the molecule. Low temperature regeneration can be performed most practically by shutting off the olefin feed, and introducing hydrogen into the isobutane-rich hydrocarbon feed, at the reaction temperature of about 70° to about 100° C. to remove the C12+ heavy hydrocarbons and coke. The more severe high temperature reactivation is typically performed after a large number of low temperature regenerations, at temperatures between about 175° to about 350° C. In the high temperature reactivation, the flow of both the paraffin and the olefin is stopped, and hydrogen gas is fed over the catalyst to remove the coke and heavy hydrocarbons.

The following examples illustrate features of the present invention. In Examples 8-14, the reactor system 100 illustrated in FIG. 1 was employed. The reactor system employs a recycle stream R to which the feed streams F-1 (olefin) and F-2 (iso-paraffin) are joined. The olefin stream F-1 comprises cis-2-butene and the iso-paraffin stream comprises isobutane. The combined streams are sent via line 101 to alkylation reactor 110, which contains a fixed bed 111 of the catalyst of the invention. The alkylation reactor is immersed in an oil bath 112 to maintain the predetermined reaction temperature. A sample for GC analysis can be drawn off at port 103 from the effluent stream 102 of the alkylation reactor 110. The effluent is divided into a recycle stream R, which is circulated by pump P back to the alkylation reactor 110 after the addition of fresh feed F-1 and F-2, and stream 104 which is sent to a separation drum 120, from which vapor V is drawn off from the top and product alkylate A (e.g., TMP isomers) is withdrawn from the bottom. Reactor 110 is operated as a fixed-bed recycle reactor to maintain a high isobutane to butene ratio and simulate a continuous stirred tank reactor (CSTR). High isobutane/butene ratios help to minimize the formation of coke and high boiling compounds which deactivate the catalyst. A fixed bed reactor can be used with several butene injection points at different bed height locations to maintain the desired isobutane/butene ratio at any given location and overall across the catalyst bed. The reaction product was a mixture of various components and/or isomers. The preferred alkylation components are isomers of TMP branched $C_8$ hydrocarbons, which each have a high research octane number ("RON"). For example, 2,2,4-trimethylpentane (isooctane) has a RON of 100. The total RON of the product alkylate of the examples was obtained by summation of the product of the weight fraction of each component (obtained from gas chromatographic (GC) analysis) multiplied by the octane number of the component. The experiments were continued until olefins occurred in the reaction product (a cutoff at 0.012 wt % was defined as the breakthrough point). At this point, olefin peaks on the gas chromatograph analysis indicated deactivation of the catalyst.

EXAMPLES

Example 1

Reference Catalyst

Metals-Free

The catalysts exemplified here use a common zeolite base, viz. a commercial ultrastable Y ("USY"), entitled CBV500, manufactured by PQ Corp. CBV500 has approximately 80 wt % zeolite and 20% alumina. The catalyst was sized to 18/25 mesh for use in the bench-scale performance tests (described below). The finished catalyst was labeled as catalyst "A".

Example 2

Preparation of 0.5 wt % Pt Containing Catalyst

The Pt reference catalyst (i.e. without a second or third added metal) was prepared with the commercial ultrastable Y ("USY"), entitled CBV500, described in Example 1. The Pt was added with a solution of platinum tetraammine nitrate salt, incorporated by the conventional incipient wetness technique. The catalyst was dried at 110° C. in air, followed by calcination at 400° C. in air. Sufficient Pt salt was used such that the finished catalyst had 0.5 wt % Pt. The finished catalyst was sized to 18/25 mesh for use in the bench-scale performance tests (described below). The finished catalyst was labeled as catalyst "B".

Example 3

Preparation of 0.15 wt % Pt Containing Catalyst

A second Pt-only catalyst (i.e. without a second or third added metal) was prepared with the commercial ultrastable Y ("USY"), entitled CBV500, described in Example 1. The Pt was added with a solution of platinum tetraammine nitrate salt, incorporated by the conventional incipient wetness technique. The catalyst was dried at 110° C. in air, followed by calcination at 400° C. in air. Sufficient Pt salt was used such that the finished catalyst had 0.15 wt % Pt. The finished catalyst was sized to 18/25 mesh for use in the bench-scale performance tests (described below). The finished catalyst was labeled as catalyst "C".

Example 4

Preparation of Pt/Ni Catalyst

A Pt/Ni catalyst was prepared with the commercial ultrastable Y ("USY"), entitled CBV500, described in Example 1. The Pt was added with a solution of platinum tetraammine nitrate salt, incorporated by the conventional incipient wetness technique. The catalyst was dried at 110° C. in air, followed by calcination at 400° C. in air. Sufficient Pt salt was used such that the finished catalyst had 0.12 wt % Pt. A second metals incorporation step was employed to add the Ni. The Ni was added with a solution of nickel nitrate salt, incorporated by the conventional incipient wetness technique. The catalyst was dried at 110° C. in air, followed by calcination at 400° in air. Sufficient Ni salt was used such that the finished catalyst had 0.10 wt % Ni. The finished catalyst was sized to 18/25 mesh for use in the bench-scale performance tests (described below). The finished catalyst was labeled as catalyst "D".

Example 5

Preparation of Pt/Ni Catalyst (Low Loading)

A Pt/Ni catalyst was prepared with the commercial ultrastable Y ("USY"), entitled CBV500, described in Example 1. The Pt was added with a solution of platinum tetraammine nitrate salt, incorporated by the conventional incipient wetness technique. The catalyst was dried at 110° C. in air, followed by calcination at 400° C. in air. Sufficient Pt salt was used such that the finished catalyst had 0.06 wt % Pt. A second metals incorporation step was employed to add the Ni. The Ni was added with a solution of nickel nitrate salt, incorporated by the conventional incipient wetness technique. The catalyst was dried at 110° C. in air, followed by calcination at 400° C. in air. Sufficient Ni salt was used such that the finished catalyst had 0.05 wt % Ni. The finished catalyst was sized to 18/25 mesh for use in the bench-scale performance tests (described below). The finished catalyst was labeled as catalyst "E".

Example 6

Preparation of Pt/Co Catalyst

Based on the unexpected and synergistic benefits of the Ni/Pt catalyst, a Pt/Co catalyst was also prepared with the commercial ultrastable Y ("USY"), entitled CBV500, described in Example 1. The Pt was added with a solution of platinum tetraammine nitrate salt, incorporated by the conventional incipient wetness technique. The catalyst was dried at 110° C. in air, followed by calcination at 400° C. in air. Sufficient Pt salt was used such that the finished catalyst had 0.12 wt % Pt. A second metals incorporation step was employed to add the Co. The Co was added with a solution of cobalt nitrate salt, incorporated by the conventional incipient wetness technique. The catalyst was dried at 110° C. in air, followed by calcination at 400° C. in air. Sufficient Co salt was used such that the finished catalyst had 0.11 wt % Co. The finished catalyst was sized to 18/25 mesh for use in the bench-scale performance tests (described below). The finished catalyst was labeled as catalyst "F".

Example 7

Preparation of 0.5 wt % Ni Comparative Catalyst (No Pt Loading)

A Ni-only catalyst was prepared with the commercial ultrastable Y ("USY"), entitled CBV500, described in Example 1. The Ni was added with a solution of nickel nitrate salt, incorporated by the conventional incipient wetness technique. The catalyst was dried at 110° C. in air, followed by calcination at 400° C. in air. Sufficient Ni salt was used such that the finished catalyst had 0.5 wt % Ni. The finished catalyst was sized to 18/25 mesh for use in the bench-scale performance tests (described below). The finished catalyst was labeled as catalyst "G".

Example 8

Alkylation Performance Testing and Catalyst Regeneration

Catalyst B

The bench-scale alkylation testing was carried out in the reactor system 100 illustrated in FIG. 1 at 80° C., and 400 psig total pressure. The reactant was a mixture of 2-butene ("olefin" or "O") and isobutane ("I"), with an overall I/O molar ratio of 16. Due to the isobutane recycle, the internal I/O ratio was approximately 750. Catalyst B was pretreated by heating from room temperature to 300° C. at 1° C./min in flowing air (75 ml/min/gram catalyst), holding 2 hr at this temperature, cooling down to room temperature, followed by switching to hydrogen flow of 20 ml/min/gram catalyst while heating to 275° C. at 1° C./minute, holding for 2 hours and cooling to room temperature. Each test used 4 parts of catalyst, and 0.27 parts/min of the above reactant mixture. The product composition was monitored by GC, and the gasoline (C5+) octane number (RON) was computed. The experimental conditions reflect the industrial practice where the initial olefin conversion is 100% at the start of run.

In this process the catalyst undergoes "bandwise" aging, i.e. the "coke" (heavy hydrocarbons) buildup occurs from the front of the reactor to the back of the reactor. Catalyst deactivation occurs until olefins conversion is incomplete. This effect is termed "olefin breakthrough" or just "breakthrough". A cycle length is determined by the breakthrough time, after which the catalyst must be regenerated. In this experiment breakthrough is defined as the time when the olefins yield reached 0.012 Wt % of the product and recycled isobutane.

After breakthrough the catalyst was regenerated with flowing hydrogen, with a heating ramp rate of 1° C./minute until reaching 275° C. and then held at temperature for 2 hours.

After regeneration the catalyst was tested again at the same conditions of the first run, and olefins breakthrough was monitored. Following end of cycle, the catalyst was again regenerated, and a third performance cycle was tested.

Figure 2:
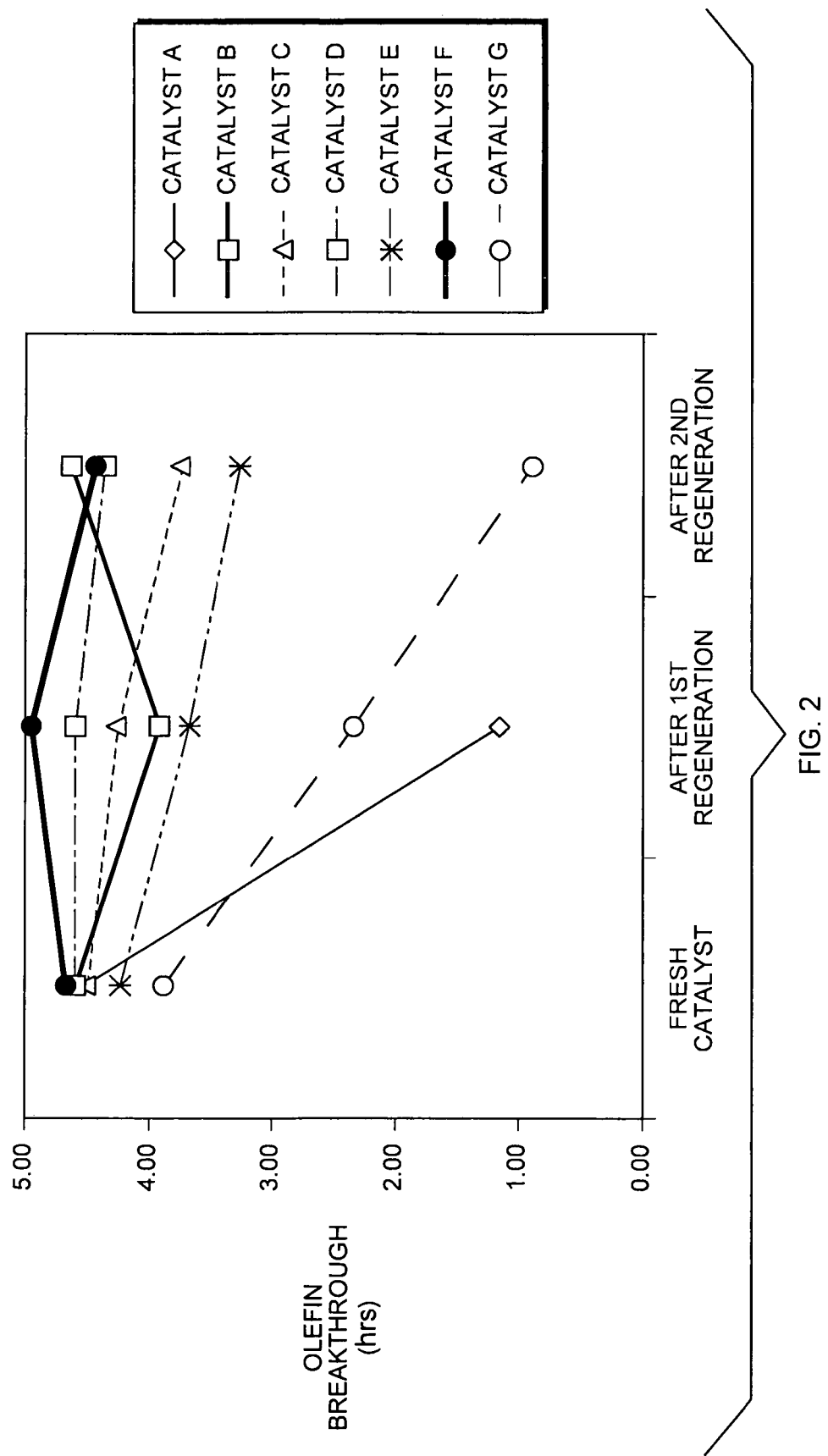
FIG. 2 is a graph showing the olefin breakthrough time for the catalysts of examples 1-7 used in the processes of Examples 8-14.

The performance results are shown in FIG. 2. Catalyst B showed breakthrough times of 4.6 hours, 3.9 hours, and 4.7 hours for the three runs. The complete performance recovery illustrated that the hydrogen regeneration procedure was highly effective.

Example 9

Alkylation Performance Testing and Catalyst Regeneration

Catalyst A

Catalyst A, the reference catalyst with no metals loading, was tested in a similar manner as in Example 8, except that it was tested for only two cycles. The fresh catalyst had a breakthrough time of 4.5 hours, indicating equivalent performance to Catalyst B. This result, along with equivalent product octane, demonstrated that the metal was not essential for alkylation performance.

After high temperature regeneration, the catalyst was tested for a second cycle, and olefins breakthrough was quite rapid—1.2 hours. This result demonstrated the criticality of metals for hydrogen regeneration. Since the second cycle performance was so inferior, a third cycle was not deemed necessary.

Example 10

Alkylation Performance Testing and Catalyst Regeneration

Catalyst C

Catalyst C, the low Pt loading catalyst, was tested in an equivalent manner as Catalyst B (example 8). The fresh catalyst had first cycle of 4.5 hours before olefins breakthrough—identical to Catalyst B performance. Based on its second and third cycle performance there was some cycle-to-cycle degradation of about 10% in each cycle. In order to achieve complete regeneration, these results indicate that the critical level of Pt is above 0.15 wt % when no other metal is present.

Example 11

Alkylation Performance Testing and Catalyst Regeneration

Catalyst D

Catalyst D, the 0.12 wt % Pt/0.10 wt % Ni loading catalyst, was tested in an equivalent manner as Catalyst B (example 8). The fresh catalyst had first cycle of 4.6 hours before olefins breakthrough—identical to Catalyst B performance. Its second cycle also had a 4.6 hour breakthrough time, followed by a 4.4 hour breakthrough for its third cycle. These results demonstrated that the bimetallic catalyst had unusually good cycle-to-cycle performance recovery.

Example 12

Alkylation Performance Testing and Catalyst Regeneration

Catalyst E

Catalyst E, the 0.06 wt % Pt/0.05 wt % Ni loading catalyst, was tested in an equivalent manner as Catalyst B (example 8). The fresh catalyst had first cycle of 4.3 hours before olefins breakthrough—nearly identical to Catalyst B performance. However, there was some cycle-to-cycle performance degradation (second cycle had a 3.7 hour breakthrough time, followed by a 3.3 hour breakthrough for its third cycle). These results demonstrated that the bimetallic catalyst had marginal to poor performance retention, but was clearly superior to the metals-free catalyst.

Example 13

Alkylation Performance Testing and Catalyst Regeneration

Catalyst F

Catalyst F, the 0.12 wt % Pt/0.11 wt % Co loading catalyst, was tested in an equivalent manner as Catalyst B (example 8). The fresh catalyst had first cycle of 4.7 hours before olefins breakthrough—identical to Catalyst B performance. Its second cycle had a 4.9 hour breakthrough time, followed by a 4.4 hour breakthrough for its third cycle. These results demonstrated that the PtCo bimetallic catalyst also had good cycle-to-cycle performance recovery.

Example 14

Alkylation Performance Testing and Catalyst Regeneration

Catalyst G

Catalyst G, the 0.50 wt % Ni loading catalyst, was tested in an equivalent manner as Catalyst B (example 8). The fresh catalyst had first cycle of 3.9 hours before olefins breakthrough—15% lower than the Catalyst B performance. Its second cycle only had a 2.4 hour breakthrough time, followed by a 0.9 hour breakthrough for its third cycle. These results demonstrated that the Ni only catalyst showed very poor cycle-to-cycle performance recovery, indicating that the presence of at least some noble metal is required for regeneration purposes.

Example 15

Characterization Methodology of Pt and Bimetallic Alkylation Catalysts

A series of catalysts were prepared for characterization by CO chemisorption and FTIR. A 0.35 wt % Pt on ultrastable Y ("USY") sample was prepared, labeled as "Catalyst H". A second sample, labeled "Catalyst I", comprised 0.105 wt % Ni/0.35 wt % Pt on USY. A third sample, labeled "Catalyst J", comprised 0.105 wt % Ni/0.12 wt % Pt on USY.

Figure 3:
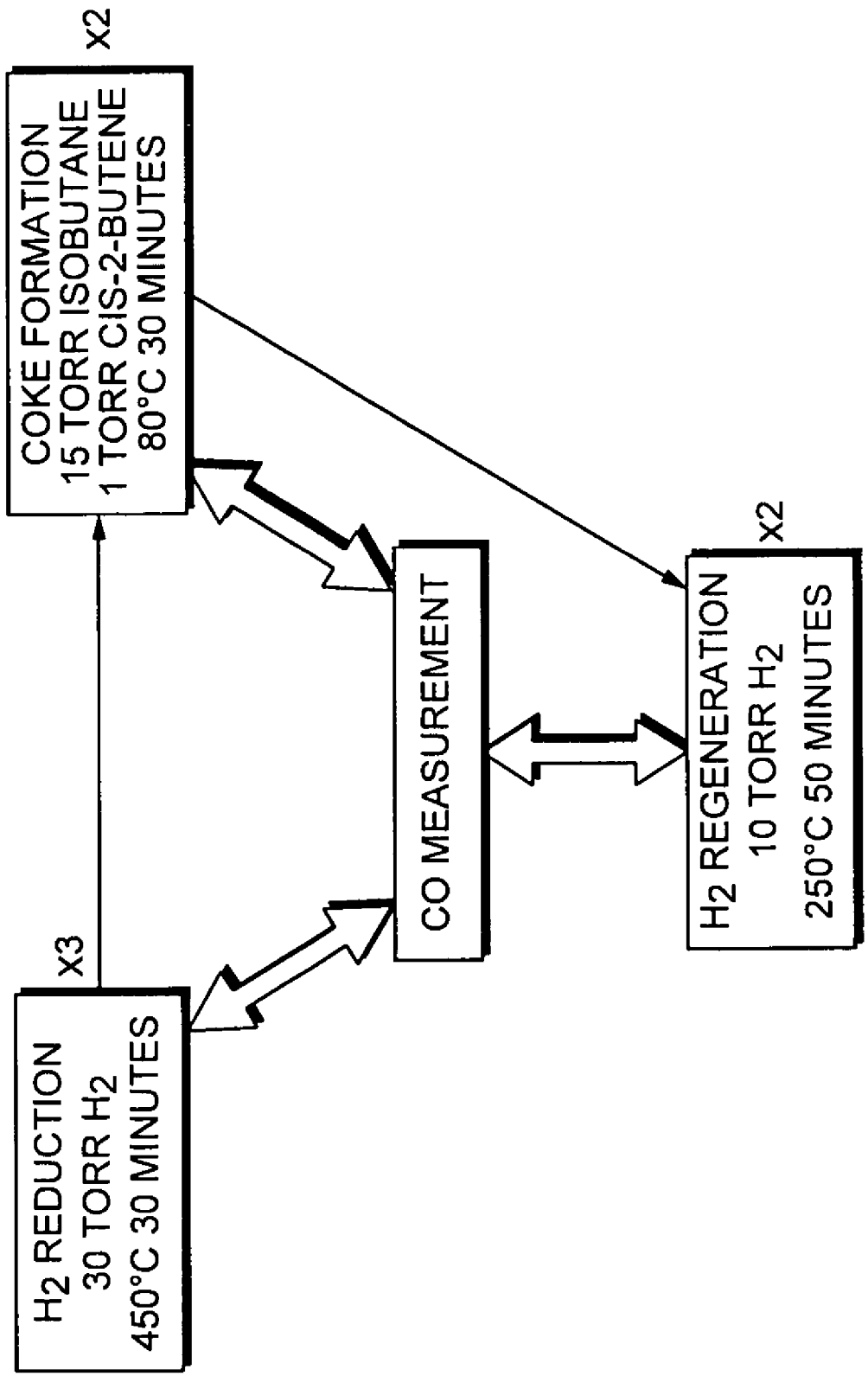
FIG. 3 is a chart summarizing the experimental procedures used in the coking and H2 regeneration procedures of the examples.

The various lab treatments of these three catalysts are shown in FIG. 3. They are:

H2 Reduction: treatment at 450° C. and 30 torr H2 partial pressure for 30 minutes. This reduction was carried out repeatedly, up to three times.

Coke formation: The catalyst was exposed to a mixture of isobutane (15 torr) and cis-2-butene (1 torr) at 80° C. and 30 minutes repeatedly, up to two times.

H2 Regeneration: The coked catalyst was exposed to 10 torr H2 at 250° C. for 50 minutes repeatedly, up to two times.

CO measurement: standard CO chemisorption characterized the various treated catalysts. The Pt dispersion could be estimated using a Pt:CO stoichiometry of 1:1. Also, the catalyst was monitored via FTIR so the particular Pt species could be determined.

FIG. 4 shows the characteristic vibrational frequencies of carbon-carbon bonds of coke and coke precursors.

Example 16

CO Chemisorption on "Coked" Catalyst H: 0.35 wt % Pt/USY

Figure 5:
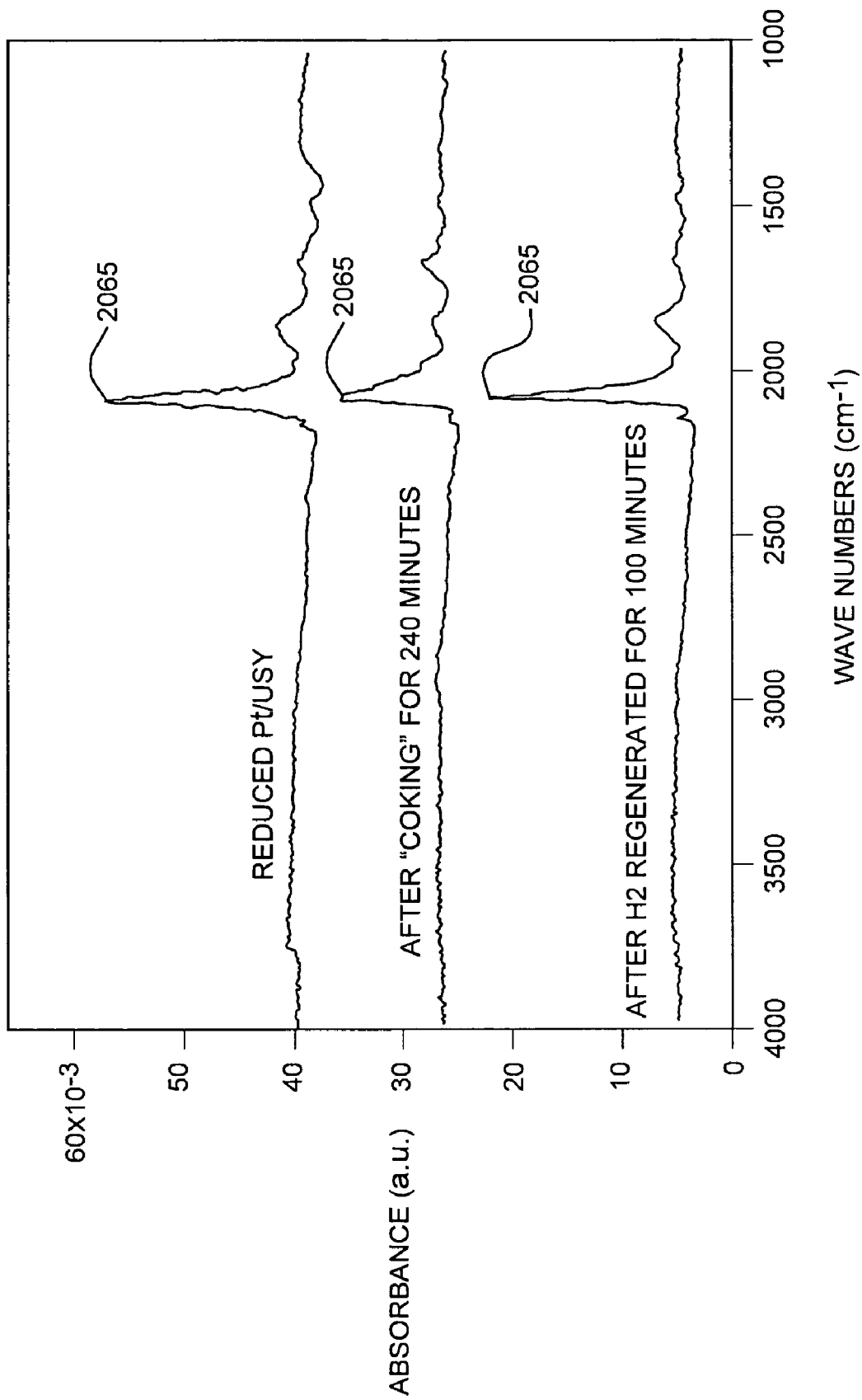
FIG. 5 is a graph of CO chemisorption on "coked" 0.35 wt % Pt/USY catalyst.

FIG. 5 shows the FTIR measurements of Catalyst H in three states: (a) reduced, (b) after "coking" for 240 minutes, and (c) after H2 regeneration for 100 minutes. The sharp, single peak at 2065 cm-1 wave numbers for (a) and (c) shows that the H2 regeneration restores Pt to its well-defined, active state. The broad peak for (b) suggests that the Pt has undergone a decline in its metal function.

Example 17

FTIR Measurement

Coke Formation on Catalyst H: 0.35 Wt % Pt/USY

Figure 6:
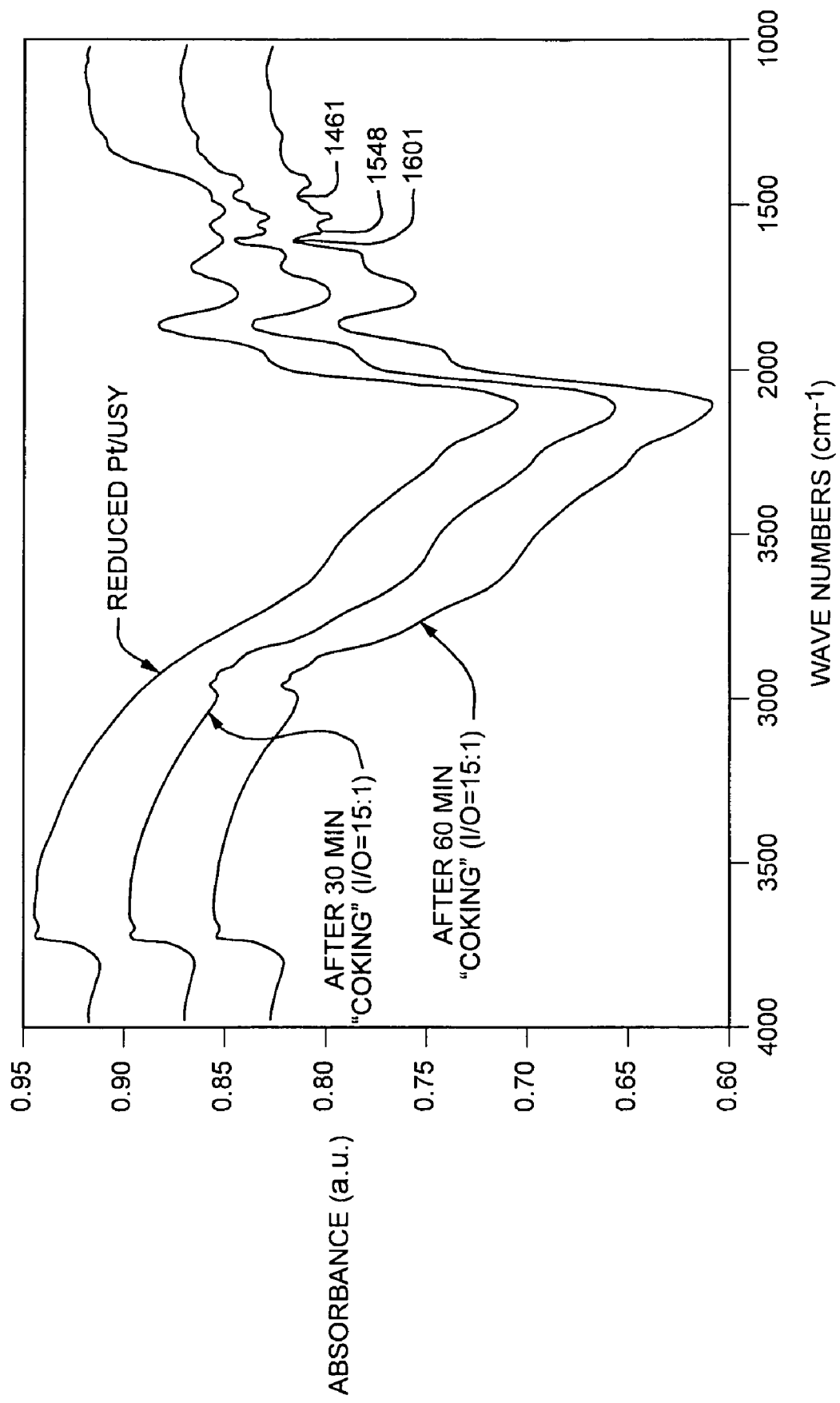
FIG. 6 is a graph showing "Coke" formation on 0.35 wt % Pt/USY catalyst.

FIG. 6 shows three Fourier Transform Infrared ("FTIR") spectra of the 0.35 wt % Pt/USY catalyst ("Catalyst H") and hydrocarbonaceous "coke". These include a hydrocarbon-free, reduced catalyst (top curve); a thirty-minute coked catalyst (middle curve); and a sixty-minute coked catalyst (bottom curve). The key area of note is at or near 3000 cm-1 wave numbers, a region which illustrates aliphatic (i.e. paraffinic) hydrocarbons. The reduced catalyst shows essentially no hydrocarbon present while the coked catalysts both indicate the presence of aliphatic hydrocarbons. The longer coked catalyst (bottom curve) had significantly more hydrocarbonaceous material present.

Example 18

FTIR Measurement

H2 Regenerated Catalyst H: 0.35 wt % Pt/USY

Figure 7:
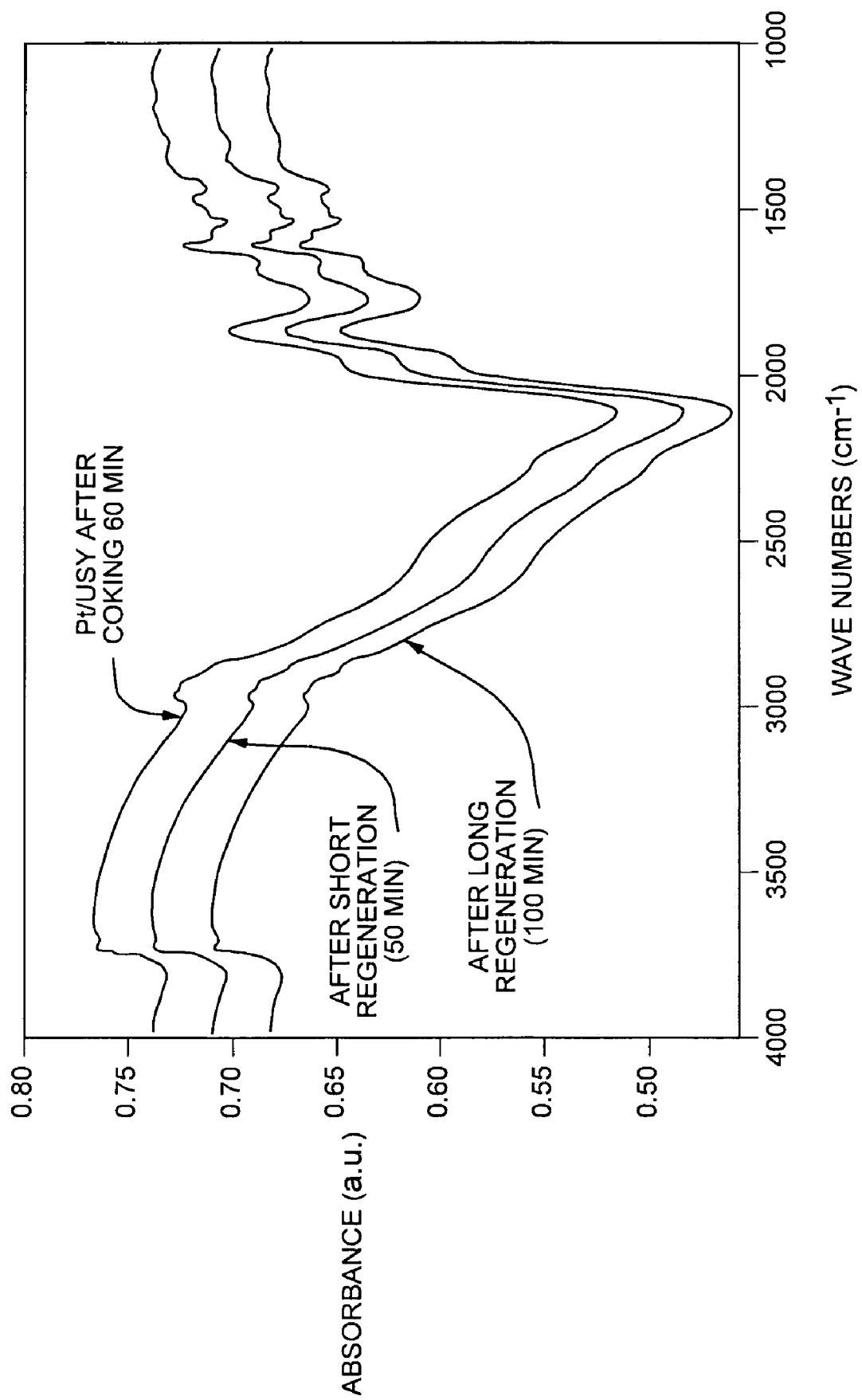
FIG. 7 is a graph showing $H_2$ regeneration of 0.35 wt % Pt/USY catalyst.

FIG. 7 shows three Fourier Transform Infrared ("FTIR") spectra of the 0.35 wt % Pt/USY catalyst ("Catalyst H") and hydrocarbon. The top curve (same as bottom curve for FIG. 6) is of the sixty-minute coked Pt/USY sample. This catalyst was regenerated in H2 for 50 minutes (middle curve) and 100 minutes (bottom curve). While both regenerations worked, the longer time was more effective at removing most of the coke.

Example 19

FTIR Measurement

Coke Formation on Catalyst I: 0.105 Wt % Ni-0.35 Wt % Pt/USY

Figure 8:
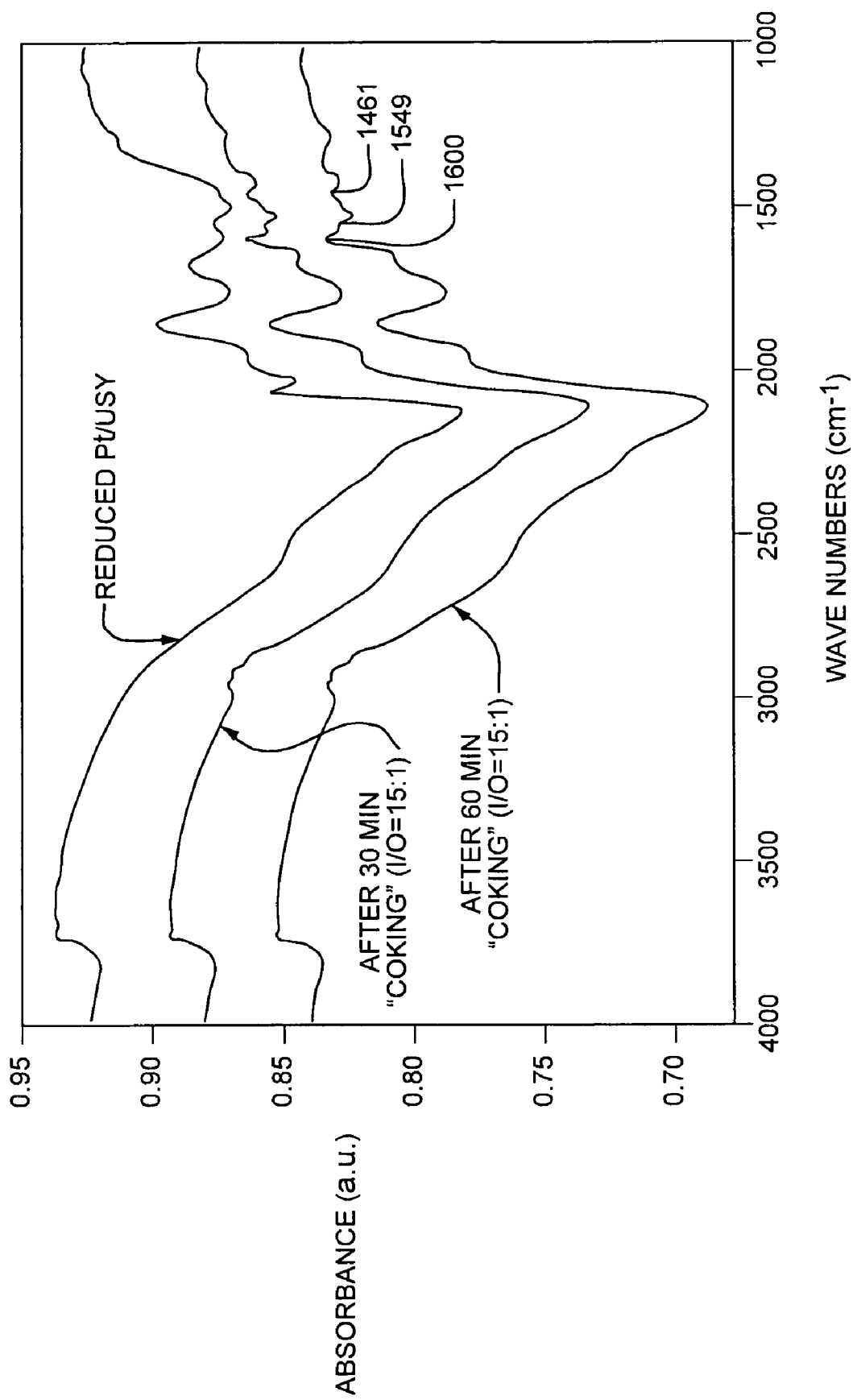
FIG. 8 is a graph showing "Coke" formation on 0.105 wt % Ni-0.35 wt % Pt/USY catalyst.

FIG. 8 shows three Fourier Transform Infrared ("FTIR") spectra of Catalyst I (0.105 Wt % Ni-0.35 wt % Pt/USY) and hydrocarbonaceous "coke". These include a hydrocarbon-free, reduced catalyst (top curve); a thirty-minute coked catalyst (middle curve); and a sixty-minute coked catalyst (bottom curve). The key area of note is at or near 3000 cm-1 wave numbers, a region which illustrates aliphatic (e.g. paraffinic) hydrocarbons. The reduced catalyst shows essentially no hydrocarbon present while the coked catalysts both indicate the presence of aliphatic hydrocarbons. The longer coked catalyst (bottom curve) had more hydrocarbonaceous material present. The major finding can be seen in the comparison of the bottom curves in FIGS. 6 and 8: under the same coking conditions, the bimetallic Catalyst I (FIG. 8) had less hydrocarbon buildup than did the "Pt only" Catalyst H (FIG. 6), as shown in the 3000 cm-1 wave numbers region. This unexpected result suggests that the bimetallic catalyst has a stronger hydrogenation activity than does the "Pt only" catalyst.

Example 20

FTIR Measurement

H2 Regenerated Catalyst I: 0.105 wt % Ni-0.35 wt % Pt/USY

Figure 9:
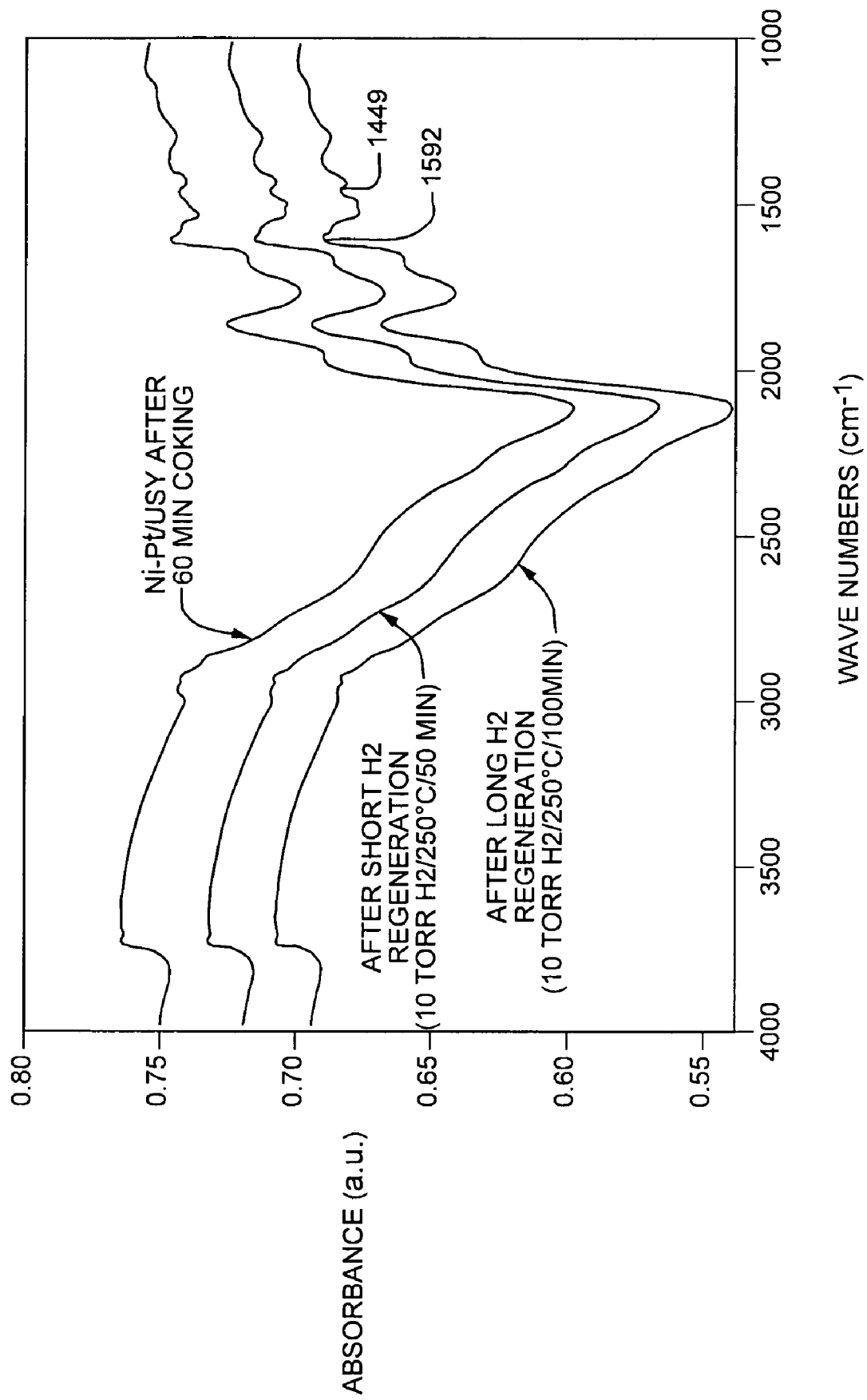
FIG. 9 is a graph showing $H_2$ regeneration of 0.105 wt % Ni-0.35 wt % Pt/USY catalyst.

FIG. 9 shows three Fourier Transform Infrared ("FTIR") spectra of the 0.105 wt % Ni-0.35 wt % Pt/USY catalyst ("Catalyst I") and hydrocarbonaceous residue ("coke"). The top curve (same as bottom curve for FIG. 8) is of the sixty-minute coked Pt/USY sample. This catalyst was regenerated in H2 for 50 minutes (middle curve) and 100 minutes (bottom curve). While both regenerations worked, the longer time was more effective at removing most of the coke. The major finding can be seen in the comparison of the bottom curves in FIGS. 7 and 9: after the same H2 regeneration conditions, the bimetallic Catalyst I (FIG. 9) had less hydrocarbon buildup than did the "Pt only" Catalyst I (FIG. 7), as shown in the 3000 cm-1 region. This unexpected result again suggested that the bimetallic catalyst had a stronger hydrogenation activity than did the "Pt only" catalyst. Since the bimetallic catalyst also formed less coke (see example 19), it is not clear if the bimetallic benefit is (a) lower coke formation or (b) both lower coke formation and better H2 regeneration. Regardless of mechanism (a) or (b), either one is clearly a superior and unexpected result.

Example 21

FTIR Measurement

Coke Formation on Catalyst J: 0.105 Wt % Ni-0.12 Wt % Pt/USY

Figure 10:
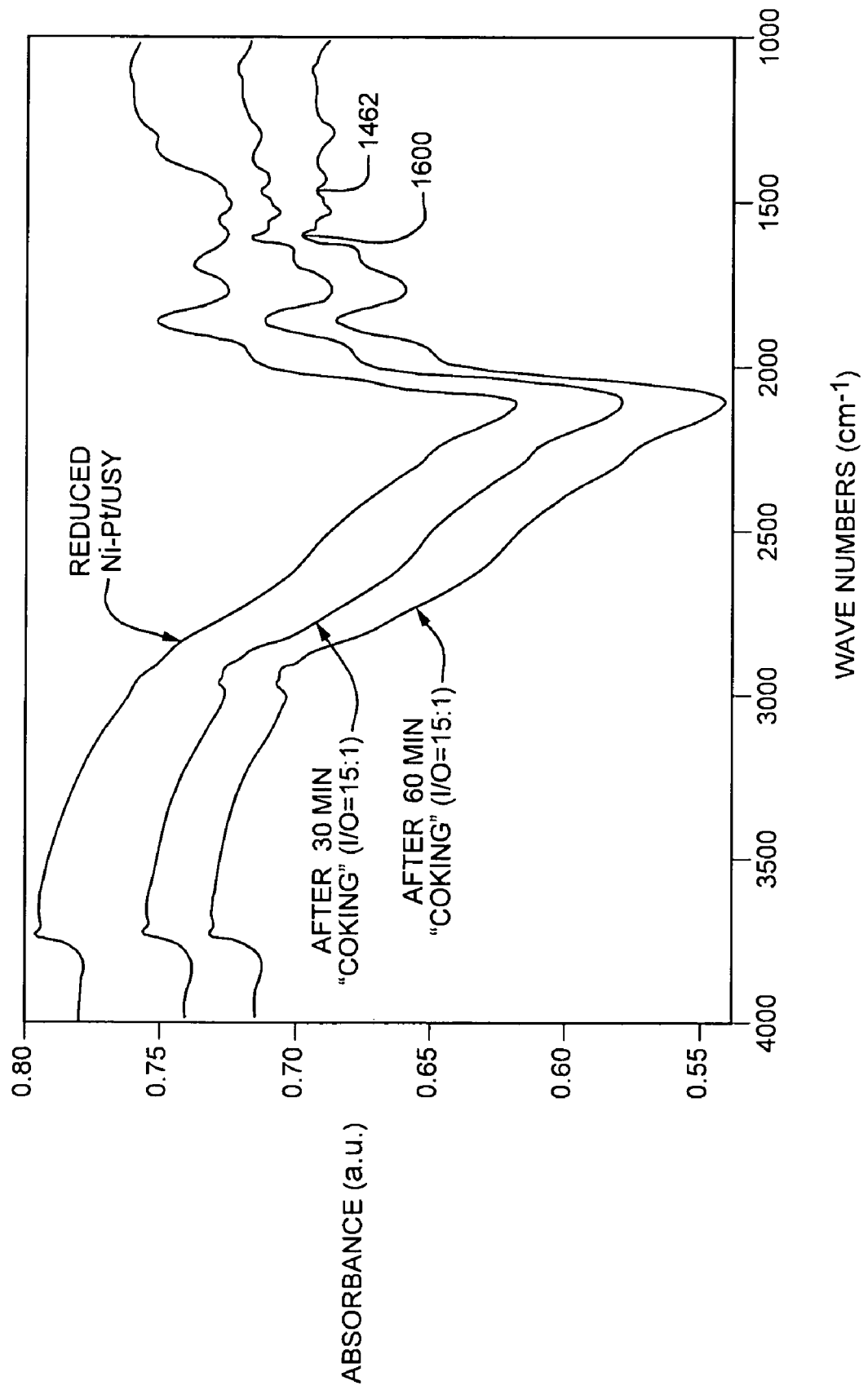
FIG. 10 is a graph showing "Coke" formation on 0.105 wt % Ni-0.12 wt % Pt/USY catalyst.

FIG. 10 shows three Fourier Transform Infrared ("FTIR") spectra of a 0.105 Wt % Ni-0.12 wt % Pt/USY catalyst ("Catalyst I") and hydrocarbonaceous "coke". These include a hydrocarbon-free, reduced catalyst (top curve); a thirty-minute coked catalyst (middle curve); and a sixty-minute coked catalyst (bottom curve). The key area of note is at or near 3000 cm-1 wave numbers, a region that illustrates aliphatic (i.e. paraffinic) hydrocarbons. The reduced catalyst showed essentially no hydrocarbon present while the coked catalysts both indicated the presence of aliphatic hydrocarbons. The longer coked catalyst (bottom curve) had significantly more hydrocarbonaceous material present. The major finding can be seen in the comparison of the bottom curves in FIGS. 6 and 8: under the same coking conditions, the bimetallic catalyst (FIG. 8) had less hydrocarbon buildup than did the "Pt only" Catalyst H (FIG. 6), as shown in the 3000 cm-1 region. This unexpected result suggested that the bimetallic catalyst had a stronger hydrogenation activity than did the "Pt only" Catalyst H. Moreover, as shown in FIG. 10, the aliphatic coke was higher for the 0.105 wt %-0.12 wt % Pt/USY, Catalyst J. This finding suggests that either (a) the Pt level was below the critical level for effectiveness or that (b) 3 Ni/Pt molar ratio and the metals levels were too low to ensure that most Pt atoms were surrounded by enough Ni to achieve the synergistic benefit observed with Catalyst I.

Example 22

FTIR Measurement

H2 Regenerated Catalyst J: 0.105 wt % Ni-0.12 wt % Pt/USY

Figure 11:
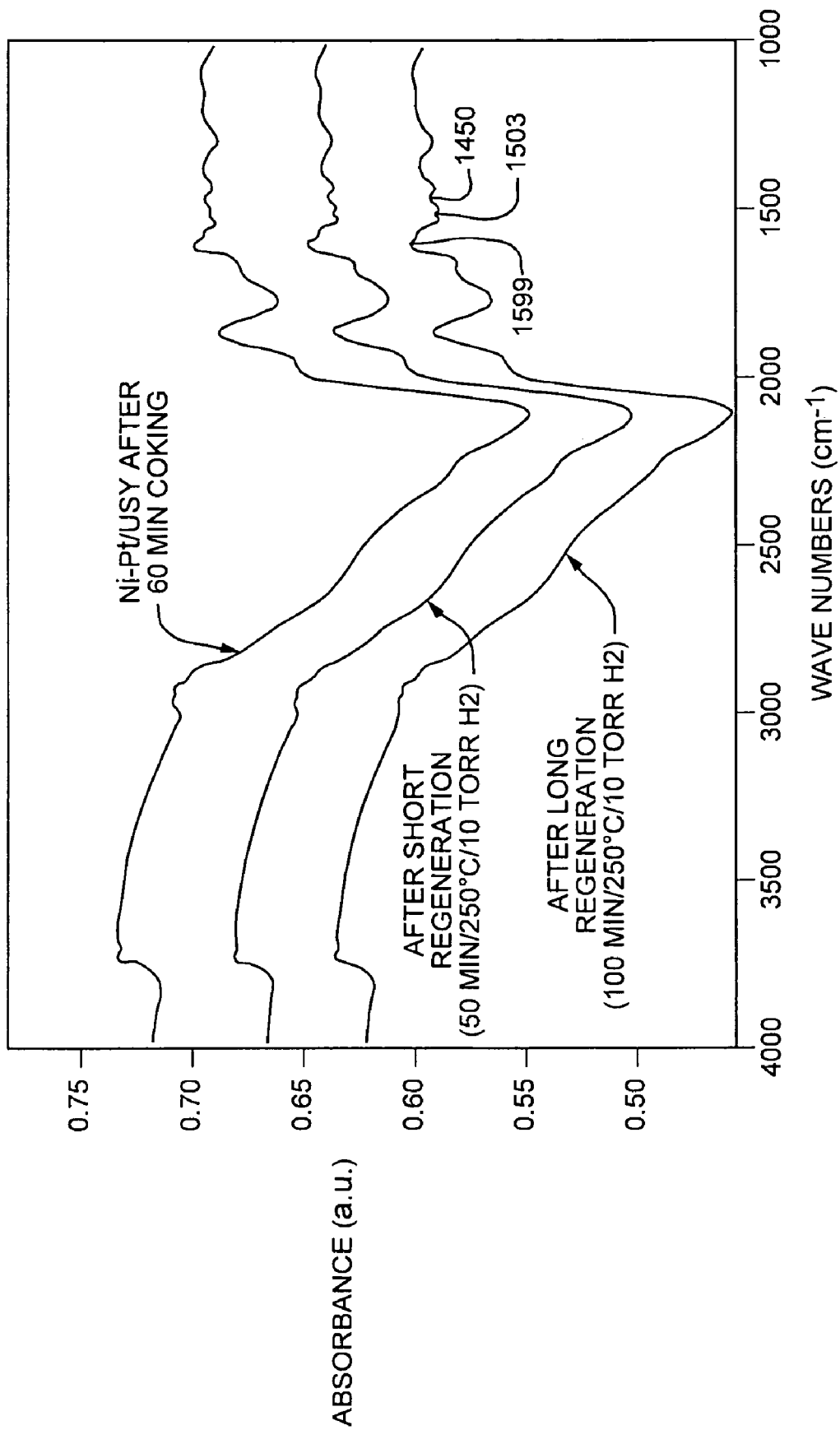
FIG. 11 is a graph showing $H_2$ regeneration of 0.105 wt % Ni-0.12 wt % Pt/USY catalyst.

FIG. 11 shows three Fourier Transform Infrared ("FTIR") spectra of the 0.105 wt % Ni-0.12 wt % Pt/USY ("Catalyst J") and hydrocarbonaceous "coke". The top curve (same as bottom curve for FIG. 8) is of the sixty-minute coked Catalyst J. This catalyst was regenerated in H2 for 50 minutes (middle curve) and 100 minutes (bottom curve). While both regenerations worked, the longer time was more effective at removing most of the coke. The major finding can be seen in the comparison of the bottom curves in FIGS. 7 and 9: after the same H2 regeneration conditions, the bimetallic catalysts (FIGS. 9 and 11) had less hydrocarbon residue than did the "Pt only" catalyst (FIG. 7), as shown in the 3000 cm-1 region. This unexpected result again suggested that the bimetallic catalysts had a stronger hydrogenation activity than did the "Pt only" catalyst. Since the bimetallic Catalyst J of Example 21 did not also form less coke than the 0.105 wt % Ni-0.35% Pt Catalyst I (see example 19), it is clear that the lower loading bimetallic catalyst's benefit is better H2 regeneration. This is clearly a superior and unexpected result.

Example 23

FTIR Measurement

CO Chemisorption Capacity of Three Coked Catalysts

Figure 12:
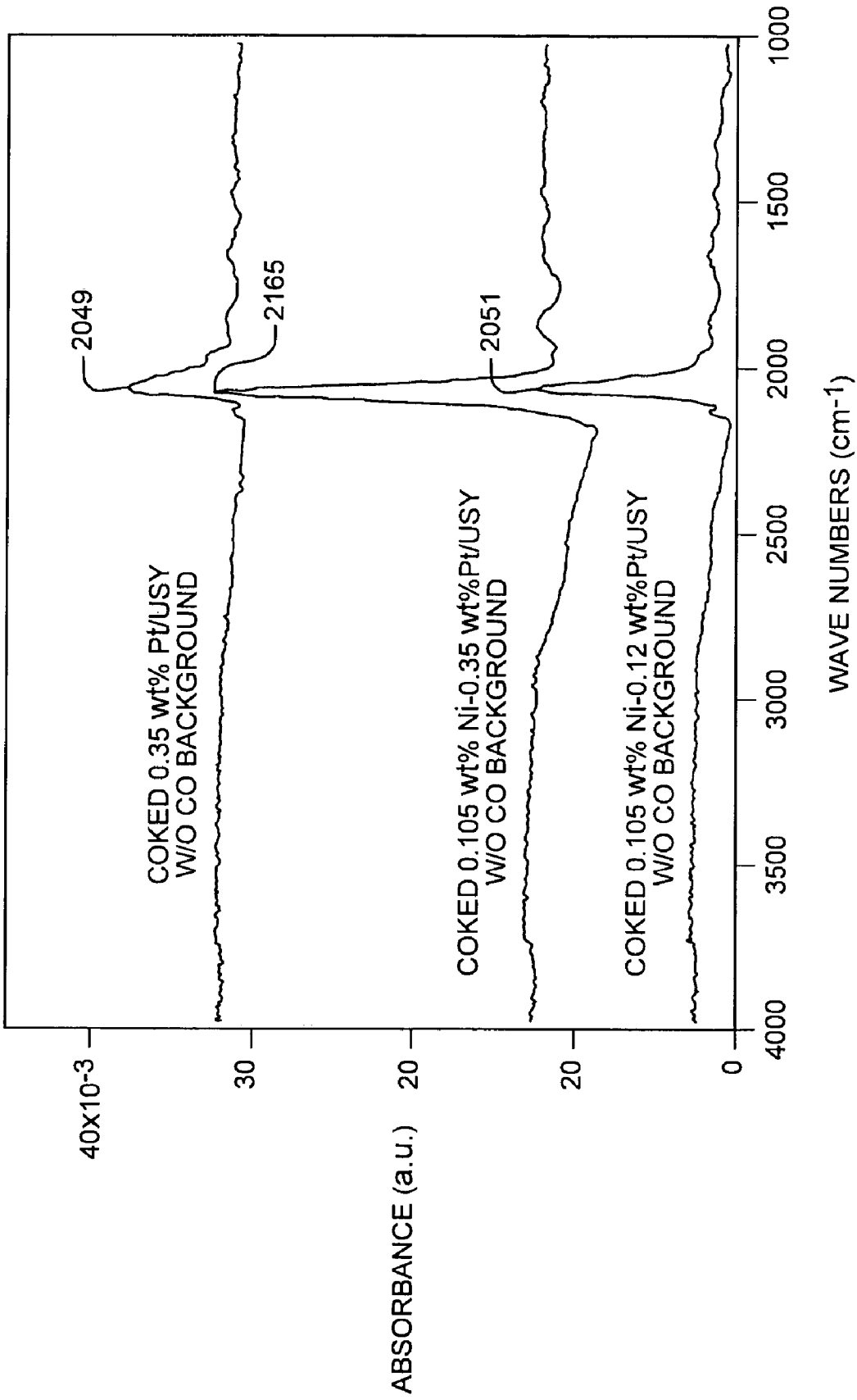
FIG. 12 is a graph showing CO chemisorption capacity on different catalysts after 60 minutes coking.

FIG. 12 shows the FTIR spectra of three catalysts (H: 0.35 wt % Pt/USY [TOP], I: 0.105 wt % Ni-0.35 wt % Pt/USY [MIDDLE], and J: 0.105 wt % Ni-0.12 wt % Pt/USY [BOTTOM]) after 60 minutes of coking. Note that the coked, Pt-only USY Catalyst H had a less intense and broader Pt peak. This indicates that the Pt is apparently less dispersed and had lower, reduced Pt. The curves for the two bimetallic catalysts showed that (a) the Pt peak was more intense and (b) more well defined (narrower). These results indicate that, upon coking, the bimetallic catalysts retain the Pt dispersion and reduced Pt function better than the Pt-only catalyst. Again, this is a superior and unexpected result.

Example 24

FTIR Measurement

CO Chemisorption Capacity of Three H2 Regenerated Catalysts

Figure 13:
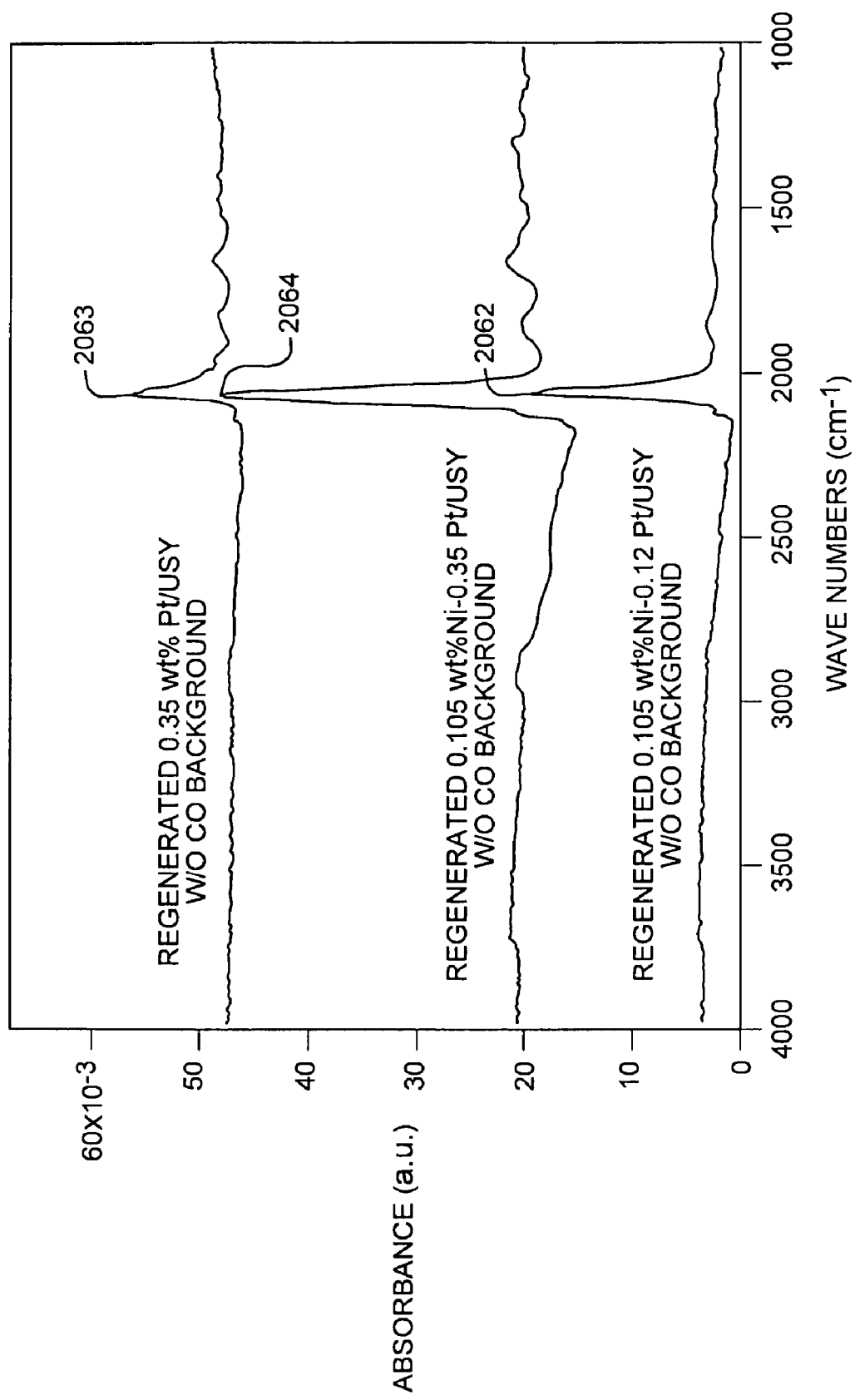
FIG. 13 is a graph showing CO chemisorption capacity on different catalysts after 100 minutes regeneration.

FIG. 13 shows the FTIR spectra of three catalysts (H: 0.35 wt % Pt/USY [TOP], I: 0.105 wt % Ni-0.35 wt % Pt/USY [MIDDLE], and J: 0.105 wt % Ni-0.12 wt % Pt/USY [BOTTOM]) after 100 minutes of H2 regeneration. Note that the H2 regenerated, Pt-only USY Catalyst H had a less intense and broader Pt peak. This indicates that the Pt is apparently less dispersed and had lower, reduced Pt. The curves for the two bimetallic catalysts showed that (a) the Pt peak was more intense and (b) more well defined (i.e. narrower). These results indicate that, upon H2 regeneration, the bimetallic catalysts retain higher Pt dispersion and reduced Pt function vs. the Pt-only catalyst. Again, this is a superior and unexpected result.

Example 25

FTIR Measurement

CO Chemisorption Capacity of Three $H_2$ Regenerated Catalysts

Figure 14:
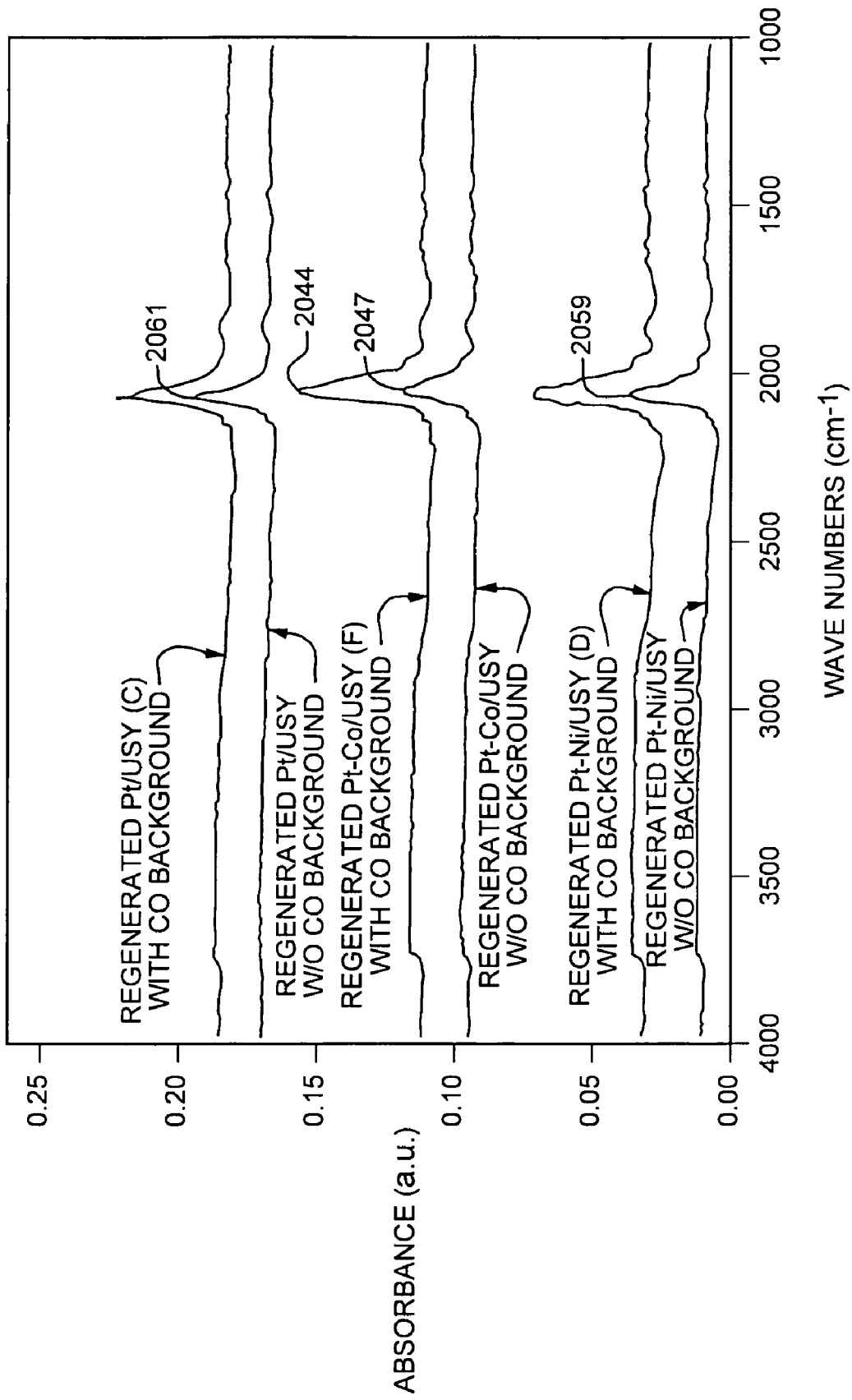
FIG. 14 is a graph showing the CO adsorption capacity of 0.15 wt % Pt, 0.12 wt % Pt-0.11 wt % Co and 0.12 wt % Pt-0.10 wt % Ni catalysts.

FIG. 14 shows two FTIR spectra each of three catalysts (C, 0.15 wt % Pt/USY [TOP], F: 0.11 wt % Co-0.12 wt % Pt/USY [MIDDLE], and D: 0.10 wt % Ni-0.12 wt % Pt/USY [BOTTOM]) after 100 minutes of H2 regeneration. For each catalyst there is a spectrum with and without a CO background atmosphere (1 torr). The three spectra without a CO background appear to be quite similar, indicating only the tightly bound CO on the Pt. Since all three catalysts have approximately equivalent Pt loadings, this result is consistent. However, when viewing the three spectra with a CO background, the PtCo and PtNi catalysts sorb more CO than does the Pt only catalyst. These results suggest that the bimetallics have more metallic function than does the Pt only catalyst, consistent with the performance benefits demonstrated by the bimetallics.

As will be recognized by those of ordinary skill in the art based on the teachings herein, numerous changes and modifications may be made to the above-described and other embodiments of the invention without departing from its scope as defined in the appended claims. Accordingly, this detailed description of preferred embodiments is to be taken in an illustrative as opposed to a limiting sense.

We claim:

1. A solid acid catalyst for use in olefin/paraffin alkylation processes comprising:
   (a) an ultrastable Y ("USY") zeolite;
   (b) a multimetallic material incorporated with the zeolite, the multimetallic material being selected from the group consisting of PtNi, PtCo, PtNiAg, PtNiAu, PtNiRu, PtNiIr, PtNiRh, PtNiRe, PdNi, PdCo, PtPdCo, PtPdNi, PdNiAg, PdNiAu, PdNiRu, PdNiIr, PdNiRh, PdNiRe, PtNiCo, PdNiCo, PtPdNiCo, PtNiCoFe, and combinations thereof, wherein
   the concentration of Pt or Pd in said multimetallic material is no greater than 0.12% by weight.

2. The solid acid catalyst of claim 1, further comprising a binder material.

3. The solid acid catalyst of claim 1, wherein the multimetallic material comprises between about 0.01 weight % to about 2.0 weight % of the solid acid catalyst.

4. The solid acid catalyst of claim 2, wherein the binder material comprises between about 5% by weight to about 70% by weight of the solid acid catalyst.

5. The solid acid catalyst of claim 4, wherein the binder material is selected from the group consisting of aluminas, silicas, silica-aluminas, zirconias, clays, and combinations thereof.

6. The solid acid catalyst of claim 1, wherein the zeolite is nanocrystalline zeolite Y.

7. A solid acid catalyst for use in olefin/paraffin alkylation processes comprising:
   (a) nanocrystalline ultrastable zeolite Y (USY);
   (b) one or more multimetallic materials incorporated in the zeolite selected from the group consisting of PtNi, PtCo, PtNiAg, PtNiAu, PtNiRu, PtNiIr, PtNiRh, PtNiRe, PdNi, PdCo, PtPdCo, PtPdNi, PdNiAg, PdNiAu, PdNiRu, PdNiIr, PdNiRh, PdNiRe, PtNiCo, PdNiCo, PtPdNiCo, PtNiCoFe, wherein the concentration of Pt or Pd in said multimetallic material is no greater than 0.12 weight percent and the multimetallic materials comprise between about 0.01% by weight to about 2.0% by weight of the weight of the solid acid catalyst; and
   (c) one or more binder materials selected from the group consisting of aluminas, silicas, silica-aluminas, zirconias, and clays, wherein the binder materials comprise between 5% by weight and 70% by weight of the solid acid catalyst.

8. The solid acid catalyst of claim 1, wherein the multimetallic material is selected from the group consisting of PtNi, PtCo, PtNiAg, PtNiAu, PtNiRu, PtNiIr, PtNiRh, PtNiRe, PtPdCo, PtPdNi, PtNiCo, PtPdNiCo, and PtNiCoFe.

9. The solid acid catalyst of claim 8, wherein the concentration of Pt is between approximately 0.05% and 0.12% by weight.

10. The solid acid catalyst of claim 8, wherein the multimetallic material is selected from PtNi and PtCo.

11. The solid acid catalyst of claim 8, wherein the multimetallic material is PtCo and the concentration of Co is no greater than 0.11% by weight.

12. The solid acid catalyst of claim 11, wherein the concentration of Pt is approximately 0.12% and the concentration of Co is approximately 0.11% by weight.

13. The solid acid catalyst of claim 8, wherein the multimetallic material is PtNi and wherein the concentration of Ni is no greater than 0.10% by weight.

14. The solid acid catalyst of claim 13, wherein the concentration of Pt is approximately 0.12% and the concentration of Ni is approximately 0.10% by weight.

15. The solid acid catalyst of claim 13, wherein the concentration of Pt is approximately 0.06% and the concentration of Ni is approximately 0.05% by weight.

16. The solid acid catalyst of claim 11, wherein the concentration of Pt is approximately 0.06% and the concentration of Co is approximately 0.055% by weight.

17. A solid acid catalyst for use in olefin/paraffin alkylation processes comprising:
  (a) an ultrastable Y ("USY") zeolite;
  (b) a multimetallic material incorporated with the zeolite, the multimetallic material being selected from the group consisting of PtNi, PtCo, PdNi and PdCo and combinations thereof, wherein
  the concentration of Pt or Pd in said multimetallic material is no greater than 0.12% by weight.

\* \* \* \* \*